United States Patent
Hanus

(10) Patent No.: US 8,794,837 B2
(45) Date of Patent: Aug. 5, 2014

(54) CONTAINER MATERIAL INCLUDING TEAR-COMPLIANT OPENING SYSTEM AND METHOD OF PRODUCTION

(71) Applicant: John P. Hanus, Hartland, WI (US)

(72) Inventor: John P. Hanus, Hartland, WI (US)

(*) Notice: Subject to any disclaimer, the term of this patent is extended or adjusted under 35 U.S.C. 154(b) by 0 days.

(21) Appl. No.: 13/741,572

(22) Filed: Jan. 15, 2013

(65) Prior Publication Data

US 2013/0189469 A1 Jul. 25, 2013

Related U.S. Application Data

(60) Provisional application No. 61/632,327, filed on Jan. 23, 2012.

(51) Int. Cl.
- *B65D 65/28* (2006.01)
- *B32B 7/04* (2006.01)
- *B32B 3/26* (2006.01)

(52) U.S. Cl.
CPC ........... *B32B 7/045* (2013.01); *B32B 2307/582* (2013.01); *B32B 3/266* (2013.01); *B32B 2439/00* (2013.01)
USPC ............. 383/207; 383/208; 383/200; 428/43; 428/201; 53/412

(58) Field of Classification Search
USPC ................ 428/43, 201; 53/412; 383/200
See application file for complete search history.

(56) References Cited

U.S. PATENT DOCUMENTS

| | | |
|---|---|---|
| 5,038,547 A | 8/1991 | Kai |
| 5,167,606 A | 12/1992 | Kuchenbecker |
| 5,192,262 A | 3/1993 | Amendola |
| 5,203,935 A | 4/1993 | May |
| 5,413,412 A | 5/1995 | Odabashian |
| 5,470,419 A | 11/1995 | Sasaki |
| 5,512,337 A | 4/1996 | Littmann |
| 5,874,155 A | 2/1999 | Gehrke |
| 5,934,809 A | 8/1999 | Marbler |
| 6,062,470 A | 5/2000 | Robichaud |
| 6,173,554 B1 | 1/2001 | Marbler |
| 6,296,389 B1 * | 10/2001 | Yamamoto et al. ........... 383/210 |
| 6,446,860 B1 | 9/2002 | Robichaud |
| 7,789,291 B2 | 9/2010 | Andersson |
| 7,810,641 B2 | 10/2010 | Hungler |
| 2010/0221469 A1 * | 9/2010 | Mills et al. ................... 428/35.5 |

* cited by examiner

*Primary Examiner* — Gwendolyn Blackwell
*Assistant Examiner* — Jasper Saberi

(57) ABSTRACT

A composite material to be used in construction of a container includes a tear compliant area in the form of a non-bonded strip between composite material layers designed to allow a user to more easily open the package and remove the contents. The non-bonded tear compliant strip incorporated in the composite material may also embody additional tear proponents in the form of perforations, slits or other material weakening feature included in the outside layer of the material.

6 Claims, 2 Drawing Sheets

CONTAINER MATERIAL INCLUDING TEAR-COMPLIANT OPENING SYSTEM AND METHOD OF PRODUCTION

CROSS REFERENCE TO RELATED APPLICATIONS

The application claims the benefit of U.S. Provisional Application No. 61/632,327 filed Jan. 23, 2012.

FIELD OF THE INVENTION

The present invention relates to material used to create a container that includes a feature produced during construction of the material which will allow a user to open the container without need of mechanical means such as scissors or the like. More specifically, the invention relates to material used to create a container that includes an opening feature constructed during the lamination process of 2 or more layers of paper, film or other tear compliant material.

BACKGROUND OF THE INVENTION

A number of improvements in methods to initiate and control the opening of a container have been described in the prior art. Various opening means in the form of perforations, slits, tear tapes or other techniques have been employed to produce a container that is convenient for the user to open without requiring external mechanical means.

One technique best illustrated in U.S. Pat. No. 7,789,291 and U.S. Pat. No. 7,810,641 incorporates cuts to facilitate tearing along a weakened line thereby providing an opening structure in the material. Due to the complete perforation of the material, this method is not suitable for use with food products or the like due to its lack of an effective barrier seal. U.S. Pat. No. 5,934,809, U.S. Pat. No. 6,173,554, U.S. Pat. No. 5,038,547 and U.S. Pat. No. 5,413,412 include perforations along with a layer of film forming material positioned over the line of weakness to insure the integrity of the seal. Inclusion of the film forming material requires an additional production step. A tear string embedded in the packaging material as shown in U.S. Pat. No. 5,470,419 and U.S. Pat. No. 5,203,935 also requires an additional step in the construction process. Another opening structure involves producing an integral tear tape by including parallel weakened lines in the material as best shown in U.S. Pat. No. 5,192,262. U.S. Pat. No. 5,167,606 includes lines of weakness in each laminate wherein the lines of weakness are offset to prevent premature tearing. U.S. Pat. No. 5,874,155 and U.S. Pat. No. 5,512,337 include multiple cuts or nicks on the surface of the material to facilitate tearing. In another technique, the line of weakness is produced by cutting through the material to a predetermined depth without cutting completely through as per U.S. Pat. No. 6,062,470 and U.S. Pat. No. 6,446,860. In this design, integrity of the moisture barrier is determined by the accuracy of the penetration created by the cutting tool.

As seen in the prior art, a need has been established for producing a container material with easy opening means and wherein a variety of techniques are currently utilized to achieve these results. A major concern with any technique for opening a container is product integrity, especially when related to food packaging. In some prior art examples, airtightness and leakability are not of great concern, wherein in food products, barrier integrity cannot be compromised. As such, a need for a material that will be both easy to open while providing product safety and integrity in a cost effective manner is needed.

The invention relates to multilayer composite materials constructed of a composition of 2 or more layers of paper, film or other tear compliant material which would be used to create a container. More specifically, the invention relates to multilayer composite material used to create a container that includes an area of weakness designed to allow the container to be opened along a controlled path in a manner that will retain container integrity while also being able to be manufactured in a cost effective and efficient manner.

BRIEF SUMMARY OF THE INVENTION

The present invention describes a composite material used to produce a container, the material being constructed through a technique which will allow the user to open the container by tearing the composite container material in a designated tear compliant area. The invention describes an opening system wherein composite container material will tear with less effort in the designated tear compliant area in comparison to the material that creates the rest of the composite material, this material being relatively non-tear compliant in comparison due to the construction technique herein described.

The invention describes a composite container material that includes an opening system created during the lamination process of 2 or more layers of tear compliant lamina that in turn make up the composite material. In one non-limiting construction technique, laminating adhesive is applied to the inside surface of one of the layers of the container material in a predetermined configuration that results in a specific area between the layers of the composite material being excluded from receiving the laminating adhesive. The application of the laminating adhesive in a predetermined configuration can be accomplished through a variety of techniques. In one non-limiting technique, an application roller applies an adhesive between the layers of the composite material during the lamination process. In reference to the invention, the adhesive application roller is designed to feature a specified area on its surface designated to exclude laminating adhesive from being transferred to the layers of the composite container material in a predetermined area. The application of the adhesive could also be accomplished by spraying the adhesive onto one of the layers in a specific configuration or through any other adhesive application technique without deviating from the scope of the invention. In addition, the invention could be produced using materials that do not require adhesive such as materials that could be bonded together through a heat sealed lamination process or any other laminating technique that would be designed to control and eliminate bonding in a predetermined area.

As is common practice in the industry, container materials are typically constructed of several layers of material which can also be of different types and with different characteristics, especially in regard to air and moisture barrier properties. As such, it is common for a container material to include multiple lamina of different types which are assembled in separate operations. In reference to the invention, the upper layer and/or lower layer could be further constructed of multiple lamina, with single or multiple lamina herein to be designated as being the outer layer or inner layer for clarity.

When the tear compliant layers comprising the composite container material are assembled, the resultant material could best be described as being a laminated material that includes an area, preferably in the form of a 'strip' wherein the layers are not laminated together. As such, the invention utilizes the characteristic of materials not laminated together to tear with less effort than materials that are laminated together.

The present invention describes construction of composite material having a propensity to tear along a strip in which the layers comprising the composite material are not laminated together. The present invention provides a tear compliant strip to be included in the container material wherein the tear compliant strip will allow a user of the container to produce a relatively straight tear in the container material rather than an uncontrolled tear as the user opens the container.

In a preferred embodiment, the tear compliant strip will include additional tear assistance through inclusion of perforations, cuts, laser treatment or any other material weakening feature in the outermost layer of the composite material while leaving the innermost layer untouched. In many container applications, especially when used with food products, it is advantageous for the layer closest to the product to remain unweakened to provide an air and moisture barrier thereby insuring product integrity. As such, the weakened areas will represent the outer layer, while the inner layer closest to the product will remain intact.

By positioning perforations or other tear assistance feature in the outside layer of the composite material and within the non-laminated tear compliant area, additional tear predisposition will be exhibited. Also, if perforations or other 'cut' features are positioned within the non-laminated area, the perforations or cuts will be restricted from filling with laminating adhesive or other bonding agent, an action which would have the effect of strengthening rather than weakening the area where the tear is desired and thereby exhibiting less tear compliance.

DETAILED DESCRIPTION OF THE INVENTION

Figure 1:
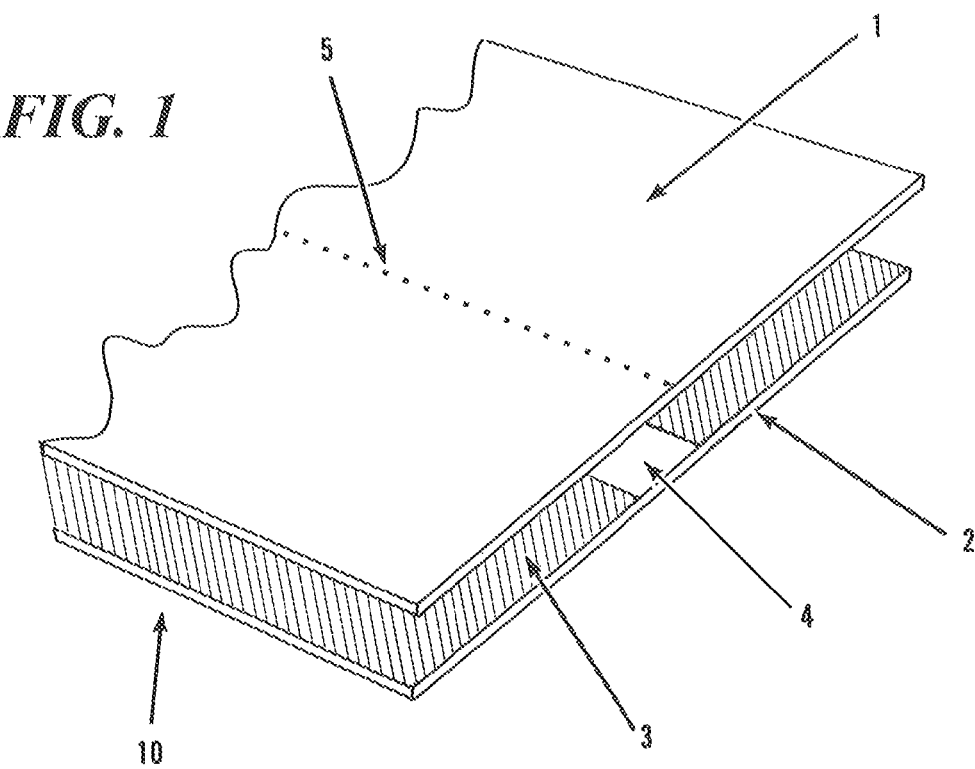
FIG. 1 is an expanded perspective view of the preassembled layers of the composite material including the adhesive application area and a preferred tear propagation feature, herein being a perforated line.
Figure 2:
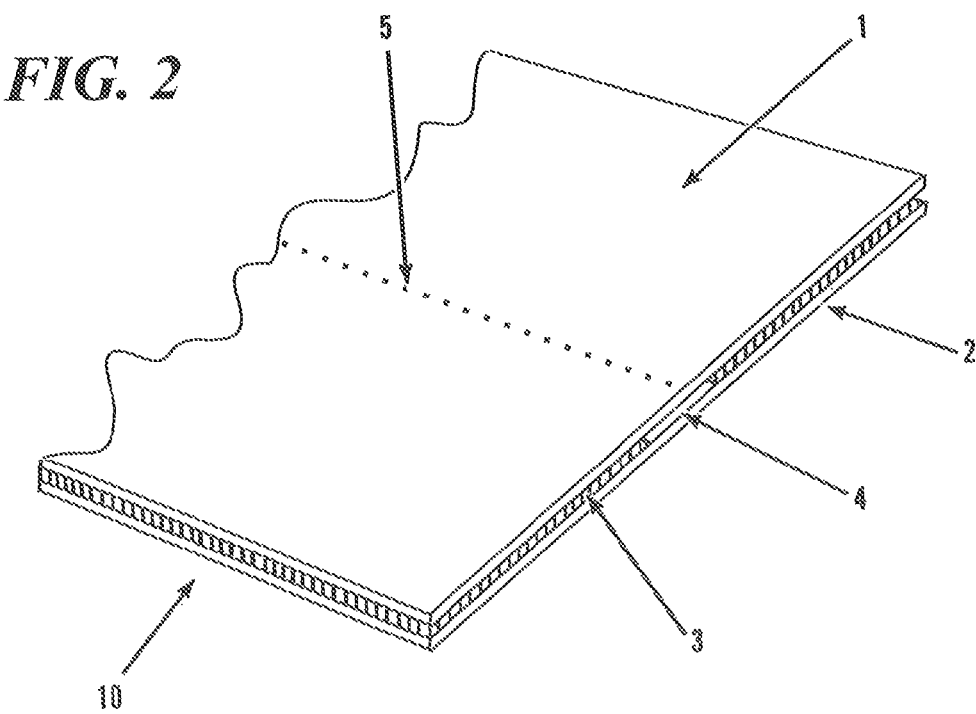
FIG. 2 is an expanded perspective view of the composite material showing the relationship of the layers and adhesive as the material is assembled.
Figure 3:
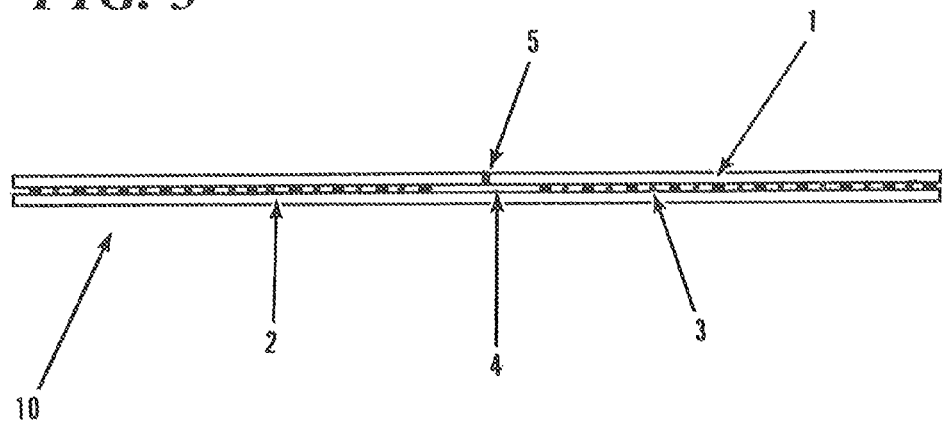
FIG. 3 is an end on view of the assembled composite container material showing the material layers, the adhesive application area and non-laminated area in exaggerated thickness for clarity.
Figure 4:
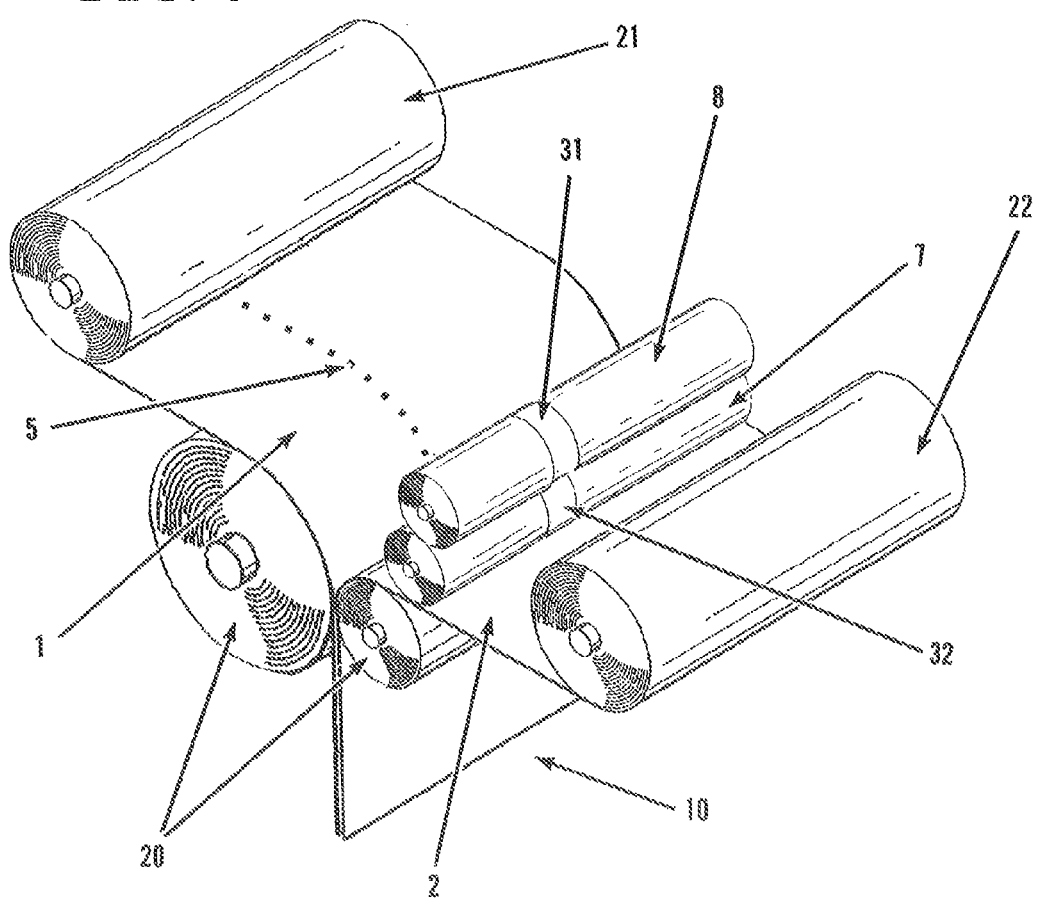
FIG. 4 is a perspective view of one non-limiting lamination technique showing the composite material including supply and application rollers and also showing one type of tear propagation feature, herein being a perforated line.

Referring to the figures, a preferred embodiment of the invention is indicated generally as material (10) in FIGS. 1-4. Material (10) suitably includes a outer layer (1) and a inner layer (2) respectively, wherein inner layer (2) would be described as being located toward the inside of the container and outer layer (1) would be described as facing the outside of the container. The invention is created during the bonding process of outer layer (1) to inner layer (2) of tear compliant materials that make up the composite container material (10). In one non-limiting construction technique, as best shown in FIGS. 1-3, laminating adhesive (3) is applied in a specific configuration resulting in a predetermined area (4) between outer layer (1) and inner layer (2) of container material (10) being excluded from receiving laminating adhesive (3). The application of adhesive (3) in a specific configuration can be accomplished through a variety of techniques. In one non-limiting technique as best shown in FIG. 4, an adhesive application roller (7) applies an adhesive to the inside surface of inner layer (2) just prior to assembly of the layers into composite material (10). It should be noted that application roller (7) could apply adhesive to the inside surface of either outer layer (1) or inner layer (2) without deviating from the scope of the invention. In practice, adhesive application roller (7) could be fed through action from a secondary supply roller (8) that would further include facility (31) for restricting the area of adhesive applied to roller (7), thereby creating predetermined area (32) on application roller (7), and in turn onto the inside surface of, in the case shown in the art, inner layer (2). In reference to the invention and as best shown in FIG. 4, material designated as outer layer (1) and inner layer (2) are supplied from material stock rolls (21) and (22) respectively, with adhesive application roller (7) including a specified area (32) on its surface that would exclude bonding adhesive from being transferred to the inside surface of inner layer (2) in a predetermined area. Outer layer (1) and inner layer (2) will subsequently be pressed to each other via laminating rollers (20) resulting in finished composite material (10). The application of adhesive could also be accomplished by spraying the adhesive onto the layers in the required specific configuration that would result in adhesive being applied with restrictions in the predetermined area or through any other adhesive application technique that would create similar application characteristics without deviating from the scope of the invention.

It should be noted that common practice in the industry is for the container material to be constructed of multiple lamina of different types and different characteristics depending on the ultimate use of the container. As such, outer layer (1) and/or inner layer (2) could each be products of multiple lamina of different materials with various characteristics appropriate for the specific container desired without deviating from the scope of the invention. The required properties of the lamina would be that they are tear compliant.

When outer layer (1) and inner layer (2) are bonded together to create composite container material (10), the result could best be described as being a composite material that includes an area, preferably in the form of a 'strip' (4) wherein outer layer (1) and inner layer (2) are not bonded together.

The invention describes construction of composite container material (10) having a propensity to tear along a strip (4), said strip best described as an area wherein outer layer (1) and inner layer (2) are not bonded together and wherein the unlaminated strip features less tear resistance in comparison to the fully laminated material that makes up the rest of the composite material.

In a preferred embodiment, as best shown in FIGS. 1-4), the tear compliant area would include additional tear assistance through inclusion of perforations, cuts, laser treatment or any other material weakening feature (5) in the outer layer (1) of the container material (10) while leaving inner layer (2) unweakened. In many container applications, especially when used with food products, it is advantageous for the layer closest to the food product to remain unweakened to insure an effective barrier layer and therein product safety. As such, the weakened areas will be apparent in the outer layer (1) while the inner layer (2) closest to the product will remain intact.

Additionally, the invention could be produced using materials that do not require an adhesive such as a material that could be laminated through a heat seal process or any other lamination technique that would result in limiting the area to be bonded together and thereby producing an unbonded strip in the composite material without deviating from the scope of the invention.

I claim:

1. A tear compliant composite material for producing a container comprising:
    a first outer layer comprising 1 or more tear compliant lamina
    a second inner layer comprising 1 or more tear compliant lamina
    said first outer layer and said second inner layer directly bonded together by an adhesive in a manner which provides for an area in the form of a tunnellike strip in the adhesive between the first outer layer and the second inner layer wherein no adhesive is present and no bonding occurs between the first outer layer and the second inner layer and which is bordered on 2 sides by the bonded layers;
    wherein the first outer layer includes a region with a tear propagation feature wherein the region is parallel to and in contact with the tunnellike strip.

2. Said composite material of claim 1 wherein said tear propagation feature comprises a series of perforations.

3. Said composite material of claim 1 wherein said tear propagation feature comprises a row of slits.

4. Said composite material of claim 1 wherein said tear propagation feature comprises a laser induced material weakened line.

5. Said composite material of claim 1 wherein said tear propagation feature comprises a heat induced material weakened line.

6. Said composite material of claim 1 wherein said tear propagation feature comprises a compression induced material weakened line.

* * * * *